US006867372B2

(12) United States Patent
Fujiwara

(10) Patent No.: US 6,867,372 B2
(45) Date of Patent: Mar. 15, 2005

(54) POWER CABLE FOR MOBILE AND TERMINAL FOR THE POWER CABLE

(75) Inventor: Hidemichi Fujiwara, Tokyo (JP)

(73) Assignee: The Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 10/021,567

(22) Filed: Dec. 12, 2001

(65) Prior Publication Data

US 2003/0111256 A1 Jun. 19, 2003

(51) Int. Cl.$^{7}$ .................. H02G 15/08
(52) U.S. Cl. .................. 174/84 C
(58) Field of Search .................. 174/74 R, 75 C, 174/78, 84 C, 128.1

(56) References Cited

U.S. PATENT DOCUMENTS

| | | | | | |
|---|---|---|---|---|---|
| 4,121,951 A | * | 10/1978 | Fortin et al. | ................ | 148/502 |
| 4,408,089 A | * | 10/1983 | Nixon | ..................... | 174/106 R |
| 4,729,939 A | * | 3/1988 | Nishikawa et al. | ......... | 420/543 |
| 5,514,837 A | * | 5/1996 | Kenny et al. | ......... | 174/110 FC |
| 5,532,910 A | * | 7/1996 | Suzuki et al. | .............. | 174/52.4 |
| 6,239,373 B1 | * | 5/2001 | Sato et al. | ................ | 174/75 C |
| 6,573,454 B2 | * | 6/2003 | Fujiwara | ................... | 174/74 R |
| 2003/0143102 A1 | * | 7/2003 | Matsuoka et al. | .......... | 420/546 |
| 2003/0145912 A1 | * | 8/2003 | Haszler et al. | .............. | 148/417 |

FOREIGN PATENT DOCUMENTS

| | | | |
|---|---|---|---|
| JP | 59-107067 | | 6/1984 |
| JP | 4-301046 | | 10/1992 |
| JP | 7-207392 | * | 8/1995 |
| JP | 8-132129 | | 5/1996 |
| JP | 2001-226754 | * | 8/2001 |

* cited by examiner

*Primary Examiner*—Chau N. Nguyen
(74) *Attorney, Agent, or Firm*—Knobbe Martens Olson & Bear LLP

(57) ABSTRACT

Provided is an automobile power cable in which a stranded wire formed of a plurality of high conductive Al alloy strands each essentially consisted of 0.05 to 0.4 wt. % of Zr, 0.05 to 0.2 wt % of Fe, 0.05 to 0.2 wt. % of Si; and 0.003 to 0.05 wt. % in total of more than one or two kinds selected from a group consisting of Be, Sr, Mg, Ti and V; and the remainder of Al and unavoidable impurities, is coated thereover with an insulation layer made of flame-resistant polyolefin resin and a shield layer formed of a braid containing more than 99 wt. % of Al.

14 Claims, 2 Drawing Sheets

POWER CABLE FOR MOBILE AND TERMINAL FOR THE POWER CABLE

FIELD OF THE INVENTION

The present invention relates to a power cable which is appropriate for wiring inside of a vehicle body of an automobile such as an electric car or a hybrid car utilizing electric power as a power source (drive source) in its entirety or in part, and also relates to a terminal for the power cable.

RELATED ART

These years, there has been attracted an electric car or a hybrid car which utilizes electric power as a power source (drive source) in its entirety in part in view of the environmental safe guard.

As a conventional automobile power cable for wiring inside of the above-mentioned electric car or hybrid car, there has been used a power cable composed of a copper stranded wire covered therearound with a vinyl chloride group resin insulation layer which is in turn surrounded therearound by a copper braid shield layer.

However, the conventional automobile power cable has been heavy and inferior in flexibility, resulting in inferior workability for wiring, and high fuel consumption due to heavy weight.

Recently, aluminum bus bars have been prosperously used for wiring connected to an inverter or a battery in order to reduce the weight. However, there has been raised such a risk that these aluminum bus bars have been preferentially corroded in a part which is made into contact with a conductor or a shield layer since the conductor and the shield layer have been made of a copper group material.

In order to solve the above-mentioned problems, the use of power cable including a stranded wire, as a conductor, made of soft aluminum (aluminum will be hereinbelow denoted simply as "Al") has been proposed. However, the soft Al stranded wire is inferior in creep resistance and is low in strength, and accordingly, a part thereof which is connected to a terminal causes such an aging effect that the contact resistance thereof becomes higher and higher. In particular, there has been raised such a problem that a power cable for an automobile which is used under vibration has not been able to stably maintain satisfactory connection.

Further, the shield layer which is made of a copper wire braid in order to expect an electromagnetic shielding effect, has raised a problem of inferior workability for wiring since the copper wires are heavy and low flexibility.

THE SUMMARY OF THE INVENTION

According to one embodiment of the present invention, there is provided an automobile power cable comprising:

a stranded wire formed of a plurality of high conductive Al alloy strands each essentially consisted of:

Zr: 0.05 to 0.4 wt. %,

Fe: 0.05 to 0.2 wt %,

Si: 0.05 to 0.2 wt. %, a total amount of one or at least two kinds selected from a group consisting of Be, Sr, Mg, Ti and V, 0.003 to 0.05 wt. %, and balance being Al and inevitable impurities;

at least one insulation layer for covering said stranded wire and at least one shield layer formed of a braid containing more than 99 wt. % of Al.

According to one embodiment of the present invention, there is provided a terminal for an automobile power cable made of Al alloy which is essentially consisted of:

Zr: 0.03 to 0.4 wt. %,

Si: 0.05 to 0.15 wt. %, and balance being Al and inevitable impurities;

wherein said terminal for the automobile power cable comprises a cylindrical terminal connected to said stranded wire in said automobile power cable as described in the above embodiment, is coated over its surface adapted to be made into contact with the stranded wire of the power cable, with a Ni layer, and is formed therein with locking grooves having a depth of greater than 0.1 mm.

According to one embodiment of the present invention, there is provided an automobile power cable comprising:

a stranded wire formed of a plurality of high strength conductive Al alloy strands each essentially consisted of:

Zr: 0.03 to 0.4 wt. %,

Fe: 0.2 to 0.7 wt %,

Si: 0.2 to 0.6 wt. %,

Mg: 0.35 to 1.2 wt. %,

Cu: 0.05 to 0.4 wt. %, a total amount of at least one of two kinds of Ti and V: 0.003 to 0.05 wt. %, and balance being Al and inevitable impurities;

at least one insulation layer for covering said stranded wire and at least one shield layer formed of a braid containing more than 99 wt. % of Al.

According to one embodiment of the present invention, there is provided a terminal for an automobile power cable made of Cu alloy which is essentially consisted of:

Zr: 10 to 40 wt. %, and balance being Cu and inevitable impurities;

wherein said terminal for the automobile power cable comprises a cylindrical terminal connected to said stranded wire in said automobile power cable as described in the above embodiment, is coated over its surface adapted to be made into contact with the stranded wire of the power cable, with an Sn layer, and is formed therein with locking grooves having a depth of greater than 0.1 mm.

BRIEF DESCRIPTION OF DRAWINGS

Detailed explanation will be hereinbelow made of preferred embodiments of the present invention with reference to the accompanying drawings which are.

DESCRIPTION OF PREFERRED EMBODIMENTS OF THE INVENTION

Figure 1:
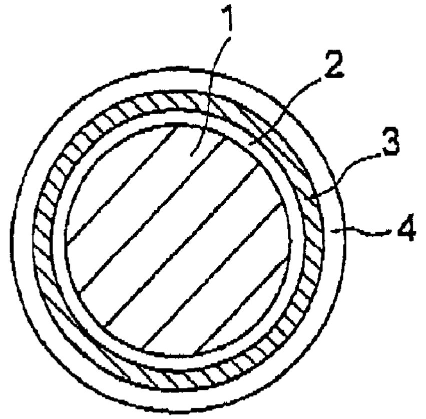
FIG. 1 is a cross-sectional view illustrating an embodiment of an automobile power cable according to the present invention.

One object of the present invention is to provide an automobile power cable which is inexpensive, which allows the vehicle to be lightweight, which can prevent preferential corrosion of bus bars made of Al, which is excellent in electrical connectability, electromagnetic shieldability and workability of wiring, and which can have high flame resistance, high flexibility and recycle-ability, and as well to provide a terminal for the above-mentioned automobile power cable, which has a low contact resistance with respect to an Al alloy conductor, and which can have satisfactory electrical persistence.

A first embodiment of the automobile power cable according to the present invention comprises:

a stranded wire formed of a plurality of high conductive Al alloy strands each essentially consisted of:

Zr: 0.05 to 0.4 wt. %,

Fe: 0.05 to 0.2 wt %,

Si: 0.05 to 0.2 wt. %, a total amount of one or at least two kinds selected from a group consisting of Be, Sr, Mg, Ti and V: 0.003 to 0.05 wt. %, and balance being Al and inevitable impurities;

at least one insulation layer for covering said stranded wire and at least one shield layer formed of a braid containing more than 99 wt. % of Al.

In the first embodiment of the automobile power cable according to the present invention, the stranded wire (or conductor) formed of the high conductive Al alloy strands can have a creep resistance which is enhanced by adding Zr and Si within the above-mentioned ranges, and a heat resistance which is enhanced by adding Fe within the above-mentioned range, and a strength which is enhanced by adding more than one or two kinds of Be, Sr, Mg, Ti and V in the above-mentioned range.

The above-mentioned ranges of the alloy composition will be hereinbelow explained.

Zr is adapted to be precipitated ($Al_3Zr$) through aging treatment so as to enhance the creep-resistance.

The content of Zr should be set in the range from 0.05 to 0.4 wt. %. If the content of Zr is less than 0.05 wt. %, the creep resistance becomes insufficient. Meanwhile, if the content of Zr exceeds 0.4 wt. %, the electric conductivity becomes lower.

Si contributes to enhancement of the creep resistance by precipitating Zr.

The content of Si should be set in a range from 0.05 to 0.2 wt. %. If the content of Si is less than 0.05 wt. %, it cannot sufficiently contribute to the enhancement of the creep resistance. Meanwhile, if the content of Si exceeds 0.2 wt. %, the electrical conductivity becomes lower.

The content of Fe should be in a range from 0.05 to 0.2 wt. %. If the content of Fe is less than 0.05 wt. %, the heat-resistance cannot be enhanced. Meanwhile, if the content of Fe exceeds 0.2 wt. %, the electrical conductivity becomes lower.

Any one of Be, Sr, Mg, Ti and V makes the cast structure fine so as to enhance the strength, and farther, promotes the precipitation ($Al_3Zr$) of Zr.

The content of more than one or two kinds of Be, Sr, Mg, Ti and V should be set in a range from 0.003 to 0.05 wt. % in total. If the content of more than one or two kinds of Be, Sr, Mg, Ti and V is less than 0.003 wt. %, it is insufficient to enhance the strength and the effect of precipitation of Zr. Meanwhile, if the content of more than one or two kinds of Be, Sr, Mg, Ti and V exceeds 0.05 wt. %, the electrical conductivity becomes lower.

In the automobile power cable according to the present invention, the insulation layer may be made of any kind of insulating materials, but it is preferably to use materials which do not contain chlorine in view of the environmental safeguard. In particular, flame-resistant polyolefin resin is desirable since it is highly flexible.

FIG. 1 shows a cross-sectional view illustrating an embodiment of the automobile power cable according to the present invention.

Although the insulation layer may be single, it may be multiple more than two, as shown in FIG. 1, that is, it consists of a first insulation layer 2 covering the stand wire (conductor) 1 formed of the high conductive Al allow strands, and a second insulation layer 4 covering a shield layer 3 surrounding the first insulation layer 2.

Figure 3:
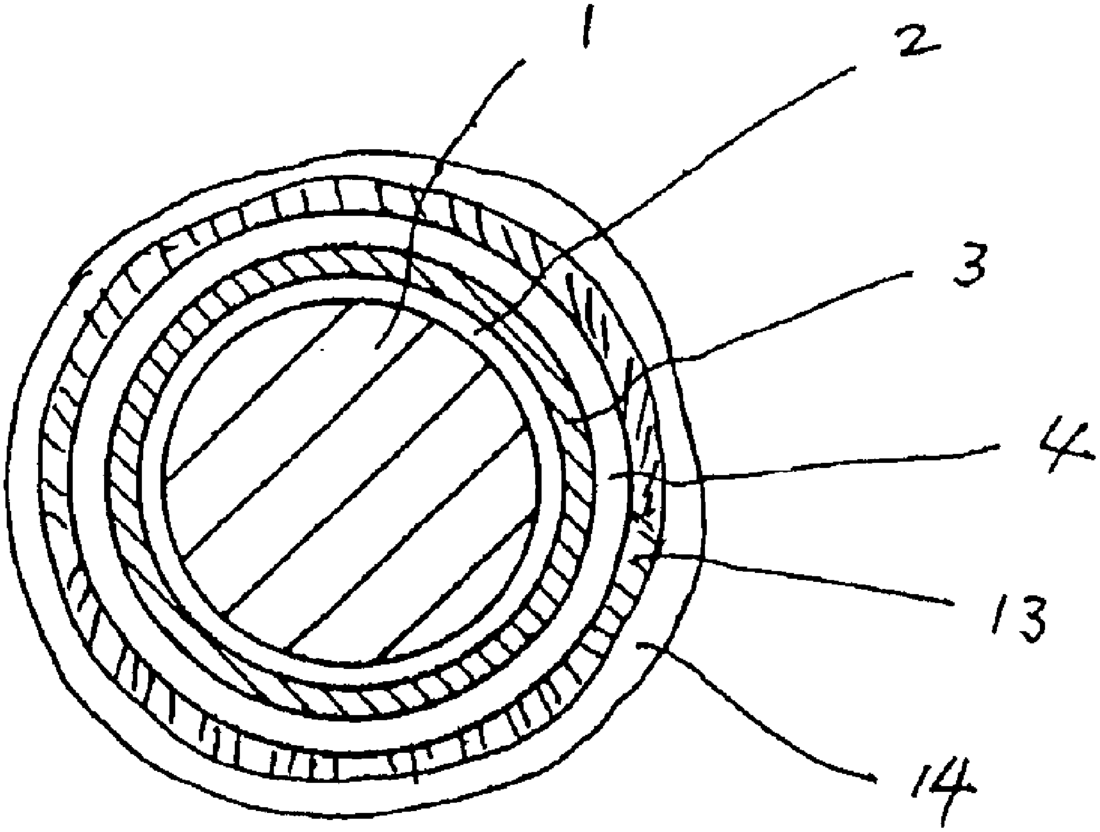
FIG. 3 is a cross-sectional view illustrating one embodiment of an automobile power cable.

Further, as shown in FIG. 3, the above-mentioned insulation layer and shield layer may consist of three or two layers, that is, a first insulation layer 2, a first shield layer 3, a second shield layer 4, second shield layer 13 and a third insulation layer 14 covering the strand wire 1, in the mentioned order (see FIG. 3).

The reason why the shield layer is formed of the braid made of Al or Al alloy, is such that Al or Al alloy is lightweight, and is excellent in flexibility, magnetic permeability and shield-ability.

Further, why the shield layer is made of the braid which contains more than 99 wt. % of Al is such that if the content of Al is less than 99 wt. %, the above-mentioned effects cannot be sufficiently obtained.

Further, the outer surface of each of the Al ally strands is coated thereover with an Ni layer. That is, each of the Al ally strands (that is, conductors) in the automobile power cable is coated thereover with the Ni layer so as to lower the contact resistance with respect to a terminal which will be detailed later, in order to stabilize the electric connectability.

An electric plating process is used for the coating of the Ni layer. In this electric playing process, NaCl substitute is preferably made prior to electric plating in order to enhance the adhesiveness of the Ni layer.

Further, the automobile power cable according to the present invention, the above-mentioned insulation layer is made of flame-resistant polyolefin resin.

A second embodiment of the automobile power cable according to the present invention comprising:

a stranded wire formed of a plurality of high strength conductive Al alloy strands each essentially consisted of:

Zr: 0.03 to 0.4 wt. %,

Fe: 0.2 to 0.7 wt %,

Si: 0.2 to 0.6 wt. %,

Mg: 0.35 to 1.2 wt. %,

Cu: 0.05 to 0.4 wt. %, a total amount of at least one of two kinds of Ti and V; 0.003 to 0.05 wt. %, and balance being Al and inevitable impurities;

at least one insulation layer for covering said stranded wire and at least one shield layer formed of a braid containing more than 99 wt. % of Al.

In the second embodiment of the automobile power cable according to the present invention, the stranded wire (or conductors formed of the strands made of high strength conductive Al alloy has a heat resistance which is enhanced by adding Zr, Fe and Cu in the above-mentioned ranges, and is adapted to enhance precipitation ($Mg_2Si$) by adding Si, Mg in the above-mentioned ranges, and to make crystal grain fine by adding Ti and V in the above-mentioned ranges so as to enhance the strength.

Explanation will be hereinbelow made of the content ranges of the composition of the above-mentioned alloy.

The content of Zr should be set in a range from 0.03 to 0.4 wt. %, and the content of Fe should be set in a range from 0.2 to 0.7 wt. %. Further, the content of Cu should be set in a range from 0.05 to 0.4 wt. %. If any one of Zr, Fe and Cu has a content which is less than the lower limit value of its own range as mentioned above, the heat-resistance cannot be satisfactorily enhanced. Meanwhile, if any one of Zr, Fe and Cu has its content which exceeds the upper limit value of its own range, the workability becomes lower.

The content of Si should be set in a range from 0.2 to 0.6 wt/%. The content of Mg should be set in a range from 0.35 to 1.2 wt. %. Any one of Si and Mg has a content which is less than the lower limit value of its own range as mentioned above, the effect of the precipitation cannot be satisfactorily obtained. Meanwhile, if any one of Si and Mg has a content which exceeds the upper limit value of its own range, the workability becomes lower.

The total content of Ti and/or V should be set in a range from 0.003 to 0.05 wt. %. If the total content of Ti and/or V is less than 0.003, the effect of fining the crystal grain cannot be satisfactorily obtained. Meanwhile, if the total content of Ti and/or V exceeds 0.05 wt. %, the above-mentioned effect is saturated so as to be disadvantageous in view of the cost.

Even in this second embodiment of the automobile power cable according to the present invention, the insulation layer and the shield layer are selected and regulated, similar to the case of the first embodiment.

As to the stranded wire formed of the Al strands in any one of the first and second embodiments of the automobile power cable according to the present invention, the strands which are obtained by carrying out aging treatment in a method including the steps of continuously casting and rolling molten Al alloy having a predetermined composition, or hot-rolling an ingot so as to obtain strand materials, and cold-rolling the strand materials into strands, are twisted so as to obtain the stranded wire. The above-mentioned aging treatment can improve the electrical conductivity and the mechanical property of the stranded wire.

As to the second embodiment of the automobile power cable according to the present invention, the reason why the shield layer is formed of the Al or Al alloy braid is such that Al or Al alloy is light weight, and is excellent in flexibility and shield-ability while has a high magnetic permeability.

Further, the reason why the shield layer is formed of a braid containing more than 99 wt. % of Al is such that if the content of Al is less than 99 wt. %, the above-mentioned effects cannot be satisfactorily obtained.

Further, in the second embodiment of the automobile power cable according to the present invention, the outer surface of each of the Al alloy strands is coated thereover with an Ni layer. That is, each of the Al alloy strands (or conductors) is coated thereover with an Ni layer so as to lower the contact resistance with respect to a terminal which will be explained later, in order to stabilize the electrical connectability.

The coating of the Ni layer is made by a usual electrical plating process or the like. In the electrical plating process, if NaCl substitute is carried out prior to the electrical plating, the adhesiveness of the Ni layer can be enhanced.

A first embodiment of a terminal for an automobile power cable according to the present invention, is made of Al alloy which is essentially consisted of;

Zr: 0.03 to 0.4 wt. %,

Si: 0.05 to 0.15 wt. %, and balance being Al and inevitable impurities;

wherein said terminal for the automobile power cable comprises a cylindrical terminal connected to said stranded wire in said automobile power cable as described in the above embodiments, is coated over its surface adapted to be made into contact with the stranded wire of the power cable, with a Ni layer, and is formed therein with locking grooves having a depth of greater than 0.1 mm.

That is, this terminal is appropriate for connection to the automobile power cable.

The first embodiment of the terminal for an automobile power cable, is made of Al alloy whose heat-resistance is enhanced by adding Zr and Si. The content of Zr should be set in a range from 0.03 to 0.4 wt. %, and the content of Si should be set in a range from 0.05 to 0.15 wt. %.

The reason why the content of Zr is set in a range from 0.03 to 0.4 wt. % and the content of Si is set in a range from 0.05 to 0.15 wt. % is such that if either of Zr and Si has a content which is less than the lower limit value of its own range as mentioned above, the heat resistance cannot be satisfactorily obtained while if either of Zr and Si has a content which exceeds the upper limit value of its own range, the electrical conductivity becomes lower.

Since the terminal is coated over its surface made into contact with the stranded wire, with the Ni-layer, the contact resistance with respect to the Al alloy stranded wire is low. The coating of the Ni layer is made by a conventional process such as an electrical plating process.

Figure 2A:
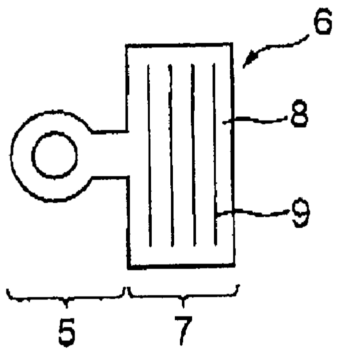
FIGS. 2A and 2B are views for explaining a terminal according to the present invention.
Figure 2B:
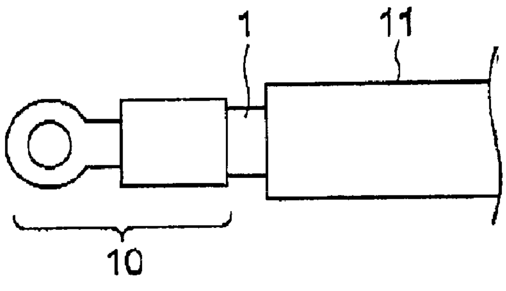

This terminal is fabricated, for example, in such a way that an Al alloy plate having a one surface Ni-plated, is stamped so as to obtain a terminal member 6 formed in its end part with a bolt hole 5 as shown in FIG. 2A, an Ni layer plating surface 8 of the terminal member 6 in a part which serves as a grip part 7 is pressed so as to form grooves 9 therein, the terminal member 6 is then rounded in to cylindrical shape with the grooves 9 facing inside, then, the edges thereof are blazed so as to obtain the terminal. This terminal 10 is crimped to the conductor 1 of the power cable 11 as shown in FIG. 2B so as to be connected to the power cable 11. The grooves 9 are formed in order to prevent the conductor (Al alloy stranded wire) from coming off. The number and pitches of the grooves 9 are optional. In order to effectively prevent the conductor 1 from coming off, the grooves are preferably formed in a direction having a right angle to the lengthwise direction of the conductor 1. The depth of the grooves 9 is set to be greater than 0.1 mm since less than 1 mm of the depth cannot satisfactorily obtain the above-mentioned effect. The grooves 9 can also enhance the contact area between the terminal 10 and the conductor 1 so as to exhibit such an effect that the contact resistance therebetween can be lowered.

The second embodiment of the terminal for an automobile power cable, according to the present invention, is made of Cu alloy which is essentially consisted of:

Zr: 10 to 40 wt. %, and balance being Cu and inevitable impurities;

wherein said terminal for the automobile power cable comprises a cylindrical terminal connected to said stranded wire in said automobile power cable as described in the above embodiments, is coated over its surface adapted to be made into contact with the stranded wire of the power cable, with an Sn layer, and is formed therein with locking grooves having a depth of greater than 0.1 mm.

That is, the terminal for an automobile power cable, according to the present invention, is made of copper alloy containing 10 to 40 wt. % of Zn, and accordingly, it is excellent in strength, heat-resistance and moldability.

The reason why the inner surface of the terminal is coated thereover with a Sn layer is such the adhesiveness with respect to the Al alloy stranded wire can be improved, and the contact resistance between the terminal and the stranded wire can be lowered.

This terminal is also formed with the grooves due to the same reasons as that of the first embodiment.

These days, consideration has been made so as to increase the voltage of batteries from 12 V to 36 V. Even though the temperature of the conductor is raised due to such an increased voltage, the contact resistance can be prevented from being increased due to creep deformation in the connection part of the terminal since the conductor according to the present invention is excellent in creep resistance.

REFERENCE EXAMPLES

The present invention will be explained in detail in view of reference examples.

Sample No. 1 of the Invention:

An Al alloy stranded wire was manufacture by twisting seven stranded wires each of which was formed by twisting 26 Al alloy strands containing 0.3 wt. % of Zr, 0.1 wt. % of Fe, 0.1 wt. % of Si, 0.02 wt. % of Sr, and the balance being Al and inevitable impurities and having a diameter of 0.45 mm (that is, the stranded wire in the first embodiment of the automobile power cable according to the present invention).

Sample No. 2 of the Invention

An Al alloy stranded wire was formed in the same method as that of forming the sample No. 1, except that each of the Al alloy stands were electrically plated with an Ni layer (that is, the stranded wire in the first embodiment of the automobile power cable according to the present invention).

Sample No. 3 of the Invention

An Al alloy stranded wire was manufactured by twisting seven stranded wires each of which was formed by twisting 26 Al alloy strands containing 0.2 wt. % of Zr, 0.4 wt. % of Fe, 0.5 wt. % of Si, 0.6 wt. % of Mg, 0.15 wt. % of Cu, 0.003 wt. % of Ti and 0.002 wt. % of V, and having a diameter of 0.45 mm (that is, the second embodiment of the automobile power cable according to the present invention).

Sample No. 4 of the Invention

An Al alloy stranded wire was formed in the same method as that of forming the sample No. 3, except that each of the Al alloy strands were electrically plated with an Ni layer (that is, the stranded wire in the second embodiment of the automobile power cable according to the present invention).

Comparison Sample No. 1

A copper stranded wire was manufactured by twisting seven stranded wires each of which was formed by twisting 20 soft copper strands having a diameter of 0.45 mm and Sn-plated.

Comparison Sample No. 2

A soft Al stranded wire was manufactured by twisting seven stranded wires each of which was formed by twisting 26 soft Al strands (containing 0.02 wt. % of Fe and 0.03 wt, % of Si) having a diameter of 0.45 mm.

The stranded wires obtained in the sample Nos. 1 to 4 and the comparison samples Nos. 1 and 2 were subjected to creep tests and electrically energizing cycle tests.

In the creep tests, a stress of 5 $kg/mm^2$ was loaded at a temperature of 90 deg. C., and a creep speed was obtained at this time.

In the electrically energizing cycle tests, each of the stranded wires was connected thereto with a brass terminal having a surface adapted to make contact with the stranded wire, and Sn-plated, by calking, and the connected part was subjected to electrically energizing cycles of 4 kVA and 0 kVA at a temperature of 90 deg. C., and during this period, an electrical resistance value between the terminal and the position of the stranded wire which has a distance of 100 mm from the terminal was measured, and a number of the energizing cycles (a life cycle number) was obtained when the electrical resistance value reaches a value which is 1.5 times as high as an initial value.

A terminal for a conductor having a sectional area of 22 $mm^2$ was used to the stranded wire in the comparison sample, and a terminal for a conductor having a cross-sectional area of 29 $mm^2$ was used for the other stranded wires. The results of the tests are shown in Table 1.

TABLE 1

| Class | Sample No | Conductor | Conductor Coating | Creep Speed %/hr | Life Cycle | Remarks |
|---|---|---|---|---|---|---|
| Invention | 1 | Formed of Al—Zr—Si—Sr—Fe | None | $9 \times 10^{-6}$ | 1,350 | First Embodi. |
| | 2 | Alloy Strands | Ni | $9 \times 10^{-6}$ | 1,500 | Second Embodi. |
| | 3 | Formed of Al—Zr—Si—Fe—Mg—Cu—Ti—V | None | $1.2 \times 10^{-5}$ | 1,300 | Third Embodi. |
| | 4 | alloy Strands | Ni | $1.2 \times 10^{-5}$ | 1,400 | Fourth Embodi. |
| Composition | 1 | Formed of Soft Copper Strands | Sn | $4 \times 10^{-4}$ | 800 | Comp. 1 |
| | 2 | Formed of Soft AL Strands | Ni | 2 | 20 | Comp. 2 |

Note: No. 2 soft Al strands are composed of Al alloy containing 0.1 wt. % of Fe and 0.1 wt. % of Si As clearly understood from Table 1, with the samples Nos. 1 to 4, the creep speed was $9\times10^{-6}$ or $1.2\times10^{-5}$ %/hr, which is lower. Meanwhile the lift cycle number was 1,300 to 1,500, which are larger so that the lift time was long. Further, in either of the comparison samples Nos. 1 and 2, the creep speed was low and accordingly, the lift time was short.

In view of the foregoing, it can be understood that the power cables according to the present invention can obtain an electrical connectability which is extremely higher than that of the conventional power cable, and accordingly, it is highly reliable, Sample No. 5 of the Invention An automobile power cable having a structure having a cross-section shown in FIG. 1 was manufactured with the use of the Al alloy stranded wire used in the sample 2 of the invention and Ni-plated (That is, the first embodiment of the automobile power cable according to the present invention).

Specifically, the Ni-plated Al alloy stranded wire 1 was covered thereover with a flame-resistant polyolefin resin insulation layer 2 compounded with Al hydroxide and having a thickness of 0.6 mm, and was covered thereover with a shield layer 3 (a braid of hard Al wires containing 0.5 wt. % of Fe and 0.1 wt. % of Si and having a diameter of 0.2 mm), and was further covered thereover with a flame-resistant polyolefin resin insulation layer 4, similar to the above-mentioned insulation layer 2, having a thickness of 0.7 mm. Thus, the automobile power cable was completed.

Sample No. 6 of the Invention

An automobile power cable was manufactured in the same method as that of forming the sample No. 5, except that the Al alloy stranded wire used in the sample No. 4 of the invention was used (that is, the second embodiment of the automobile power cable according to the present invention).

Comparison Sample No. 3

An automobile power cable was manufactured in the same method as that of forming the sample No. 5 of the invention, except that soft copper stranded wire used in the comparison sample No. 1 was used.

Comparison Sample No. 4

An automobile power cable was manufactured in the same method as that of forming the comparison example No. 3, except that a braid formed of soft copper wires having a diameter of 0.2 mm was used for the shield layer.

A weight per unit length and a bending load upon bending with a bending radius of 40 mm were measured for each of the samples Nos. 5 and 6 and the comparison examples Nos. 3 and 4.

The results of the tests are shown in Table 2 in which the measured values of the power cables are exhibited by rates with respect to the measured values of the conventional power cable composed of the soft cupper conductor covered with the soft copper wire braid (comparison sample No. 4), which are set to 100.

and shield layer, and accordingly, it was found that the wiring thereof was difficult.

Sample No. 7 of the Invention

Two kinds of terminals (for a conductor having a cross-sectional area of 29 $mm^2$) having the same shape as that shown in FIG. 2A were manufactured.

One of them is an Ni-plated terminal which was made of Al alloy containing 0.1 wt. % of Zr, and 0.1 wt. % of Si (that is, the first embodiment of the terminal for an automobile power cable according to the present invention), and which was formed, on its plating surface of a part serving as a grip part, with four grooves having a depth of 0.12 mm and extending in a direction orthogonal to the lengthwise direction of the conductor, by pressing, Sample No. 8 of the Invention The other one of them is an Sn-plated terminal which was made of Cu alloy (brass) containing 35 wt. % of Zn (that is, the second embodiment of the terminal according to the present invention), and which was formed, on its plating surface of a part serving as a grip part, with four grooves having a depth of 0.12 mm and extending in a direction orthogonal to the lengthwise direction of the conductor, by pressing.

Comparison Sample No. 5

An Ni-plated terminal made of Al alloy containing 0.1 wt. % of Zr, and 0.1 wt. % of Si was manufactured. No grooves were formed in a part serving as a grip part.

Comparison Sample No. 6

An Sn-plated brass terminal was manufactured. No grooves were formed in a part serving as a grip part.

Comparison Example No. 7

A soft Al terminal was manufactured. No grooves were formed in a part serving as a grip part.

Comparison Sample No. 8

A soft Al terminal which was formed in a Ni-plating surface of a part serving as a grip part, with grooves similar to those in the sample No. 7 of the invention, was manufactured.

TABLE 2

| Class | Sample No | Conductor | Shield Layer | Weight Rate (%) | Bending Load (%) |
|---|---|---|---|---|---|
| Invention | 5 | Formed of Ni-plated Al—Zr—Si—Sr—Fe Alloy Strands | Braid Made Hard Al Wires (more than 99 wt. % of Al) | 60 | 75 |
| | 6 | Formed of Ni-plated Al—Zr—Si—Fe—Mg—Cu—Ti—V alloy Strands | Braid Made Hard Al Wires (more than 99 wt. % of Al) | 60 | 75 |
| Composition | 3 | Formed of Sn-plated Soft Copper Strand | Braid Made Hard Al Wires (more than 99 wt. % of Al) | 85 | 90 |
| | 4 | Formed of Sn-plated Soft Copper Strand | Braid of Soft Copper wires | 100 | 100 |

Note: Hard Al wires in the shield layer is made of Al alloy containing 0.5 wt. % of Fe and 0.1 wt/% of Si. Comparison No. 4 is a conventional one.

As clearly understood from Table 2, either of the sample Nos. 5 and 6 of the invention was lightweight and had a low bending load in comparison with the conventional one (comparison example No. 4), and accordingly, it was found that the wiring thereof was simple.

On the contrary, either of the comparison samples Nos. 3 and 4 was heavy and had a high bending load since soft copper was used for the conductor alone or both conductor The insulation layer and the shield layer of the power cable according to the present invention, which was manufactured in the sample No. 5 of the invention were removed so as to expose the conductor thereof, and each of the terminals manufactured in the sample No. 7 of the invention, and the comparison sample Nos. 5–8 was connected to an end part of the conductor by crimping (pressing) as shown in FIG. 2B. The connected part was subjected to the energizing cycle tests in the same way as that of the sample No. 1 of the invention, and the lift cycle number was examined in the same way as that of the sample No. 1 of the invention.

The result of the tests are shown in Table 3.

TABLE 3

| Class | Sample No | Material of Terminal | Presence of Grooves | Life Cycle Number |
|---|---|---|---|---|
| Invention | 7 | Ni-Plated Al Alloy (Containing 0.1 wt. % of Zr and 0.1 wt/% of Si) | Yes | 4,200 |
| | 8 | Sn Plated Brass | Yes | 4,000 |
| Comparison | 5 | Sn Plated Brass | No | 800 |
| | 6 | Ni-Plated Al Alloy (Containing 0.1 wt. % of Zr and 0.1 wt/% of Si) | No | 1,200 |
| | 7 | Soft Al Alloy (Containing 0.1 wt/% of Fe and 0.1 wt. % of Si) | No | 100 |
| | 8 | Soft Al Alloy (Containing 0.1 wt/% of Fe and 0.1 wt. % of Si) | Yes | 300 |

As clearly understood from Table 3, in either of the sample Nos. 7 and 8 of the invention, the life cycle number was greater and the life time was longer.

On the contrary, since no grooves ware formed in the comparison sample Nos. 5 and 6, and since the terminal in the comparison sample No. 8 was made of soft Al, the life time was short. Since the terminal in the comparison example No. 7 was made of soft Al and was not formed in the inner surface of the grip part with grooves, the life time of the comparison sample No. 7 was too short.

In view of the foregoing, it is found that the terminal according to the present invention can obtain an remarkably high electrical connectability, and is excellent in reliability in comparison with the conventional terminals (in the comparison example Nos. 7 and 8).

As stated above, with the automobile power cable according to the present invention, (1) since the conductor (stranded wire) is made of Al alloy while the shield layer is made of Al or Al alloy, it is inexpensive and lightweight and as well it is excellent in flexibility so as to facilitate wiring, and accordingly, the vehicle body of an automobile can be lightweight so as to enhance the fuel consumption rate, and preferential corrosion of Al bus bars can be prevented while electromagnetic shield-ability can be stably held. (2) since the Al alloy used for the conductor has high electrical conductivity, creep resistance and high heat-resistance, satisfactory electrical connectability can be stably obtained. (3) Since resin without containing chlorine is used for the insulation layer, the recycle ability can be improved, and in particular, flame-resistant polyolefin resin is preferable since it is excellent in flexibility. Further, since the terminal according to the invention is made of Al alloy which contains Zr and Si so as to enhance heat-resistance, or is made of brass (copper alloy containing 10 to 40 wt. % of Zn) which is excellent in strength and heat-resistance, and since it is coated on the inner surface of the grip part with an Ni layer in the former or an Sn layer in the latter, and is formed with the grooves for preventing the conductor from coming off, the adhesiveness with respect to the Al conductor can be improved and the contact resistance can be reduced so that stable electrical connectability can be obtained. Accordingly, the automobile power cable and the terminal according to the present invention can be used in an electric car or a hybrid car which uses an electric power as a power source (drive source) in its entirety of in part so as to exhibit remarkable technical effects and advantages.

What is claimed is:

1. A terminal for an automobile power cable made of Al alloy which is consisting essentially of:

Zr: 0.03 to 0.4 wt. %,

Si: 0.05 to 0.15 wt. %, and balance being Al and inevitable impurities;

wherein said terminal for the automobile power cable comprises a cylindrical terminal connected to a stranded wire in said automobile power cable, the stranded wire formed of a plurality of high conductive Al alloy strands each consisting essentially of:

Zr: 0.05 to 0.4 wt. %,

Fe: 0.05 to 0.2 wt %,

Si: 0.05 to 0.2 wt. %, a total amount of one or at least two kinds selected from a group consisting of Be, Sr, Mg, Ti and V: 0.003 to 0.05 wt. %, and balance being Al and inevitable impurities;

at least one insulation layer for covering said stranded wire and at least one shield layer formed of a braid containing more than 99 wt. % of Al;

wherein said terminal is coated over its surface adapted to be made into contact with the stranded wire of the power cable, with a Ni layer, and is formed therein with locking grooves having a depth of greater than 0.1 mm.

2. A terminal as claimed in claim 1, wherein said insulation layer in said automobile power cable is made of flame-resistant polyolefin resin.

3. A terminal for an automobile power cable made of Cu alloy which is consisting essentially of:

Zr: 10 to 40 wt. %, and balance being Cu and inevitable impurities;

wherein said terminal for the automobile power cable comprises a cylindrical terminal connected to a stranded wire in said automobile power cable, the stranded wire formed of a plurality of high conductive Al alloy strands each consisting essentially of:

Zr: 0.05 to 0.4 wt. %,

Fe: 0.05 to 0.2 wt %,

Si: 0.05 to 0.2 wt. %, a total amount of one or at least two kinds selected from a group consisting of Be, Sr, Mg, Ti and V: 0.003 to 0.05 wt. %, and balance being Al and inevitable impurities;

at least one insulation layer for covering said stranded wire and at least one shield layer formed of a braid containing more than 99 wt. % of Al;

wherein said terminal is coated over its surface adapted to be made into contact with the stranded wire of the power cable, with an Sn layer, and is formed therein with locking grooves having a depth of greater than 0.1 mm.

4. A terminal as claimed in claim 3, wherein said insulation layer in said automobile power cable is made of flame-resistant polyolefin resin.

5. An automobile power cable comprising:

a stranded wire formed of a plurality of highly conductive Al alloy strands each consisting of:

Zr: 0.05 to 0.4 wt. %

Fe: 0.05 to 0.2 wt. %

Si: 0.05 to 0.2 wt. %

0.003 to 0.05 wt. %, and balance being Al;

at least one insulating layer for covering said stranded wire and at least one shield layer formed of a braid containing more than 99 wt. % of Al.

6. An automobile power cable as recited in claim 5, wherein each of said Al alloy strands is coated on its outer surface with a Ni layer.

7. An automobile power cable as recited in claim 5, wherein each of said insulation layer and said shield layer comprises a single layer, and said stranded wire is covered with the insulation layer and the shield layer, in this order.

8. An automobile power cable as recited in claim 7, wherein said insulation layer is made of flame-resistant polyolefin resin.

9. An automobile power cable as recited in claim 5, wherein said insulation layer comprises two layers of a first insulation layer and a second insulation layer while said shield layer comprises a single layer, and said stranded wire is covered with the first insulation layer, the shield layer and the second insulation layer, in this order.

10. An automobile power cable as recited in claim 9, wherein said insulation layer is made of flame-resistant polyolefin resin.

11. An automobile power cable as recited in claim 5, wherein said insulation layer comprises three layers of a first insulation layer, a second insulation layer and a third insulation layer while said shield layer comprises two layers of a first shield layer and a second shield layer, and said stranded wire is covered with the first insulation layer, the first shield layer, the second insulation layer, the second shield layer and the third insulation layer, in this order.

12. An automobile power cable as recited in claim 11, wherein said insulation layer is made of flame-resistant polyolefin resin.

13. An automobile power cable comprising:

a stranded wire formed of a plurality of high conductive Al alloy strands each consisting of:

Zr: 0.05 to 0.4 wt. %

Fe: 0.05 to 0.2 wt. %

Si: 0.05 to 0.2 wt. %

V: 0.003 to 0.05 wt. %, and balance being Al;

at least one insulating layer for covering said stranded wire and at least one shield layer formed of a braid containing more than 99 wt. % of Al.

14. An automobile power cable comprising:

a stranded wire formed of a plurality of highly conductive Al alloy strands each consisting essentially of:

Zr: 0.05 to 0.4 wt. %

Fe: 0.05 to 0.2 wt. %

Si: 0.05 to 0.2 wt. % a total amount of at least one kind selected from a first group consisting of Mg and Ti, and at least one kind selected from a second group consisting of Be, Sr, V: 0.003 to 0.05 wt. %, and balance being Al and inevitable impurities;

at least one insulating layer for covering said stranded wire and at least one shield layer formed of a braid containing more than 99 wt. % of Al, and wherein Ti is selected from said first group and V is selected from said second group, and said total amount of Ti and V being: 0.03 to 0.05 wt. %.

* * * * *

UNITED STATES PATENT AND TRADEMARK OFFICE

CERTIFICATE OF CORRECTION

PATENT NO. : 6,867,372 B2
DATED : March 15, 2005
INVENTOR(S) : Fujiwara

It is certified that error appears in the above-identified patent and that said Letters Patent is hereby corrected as shown below:

Column 12,
Lines 31 and 56, delete "wt" and insert -- wt. --.

Column 13,
Line 14, insert -- V: -- before "0.003".

Signed and Sealed this

Fourteenth Day of March, 2006

JON W. DUDAS
*Director of the United States Patent and Trademark Office*